Dec. 12, 1933.  V. OLDBERG  1,938,974
BUSHING
Filed April 10, 1933   2 Sheets-Sheet 1
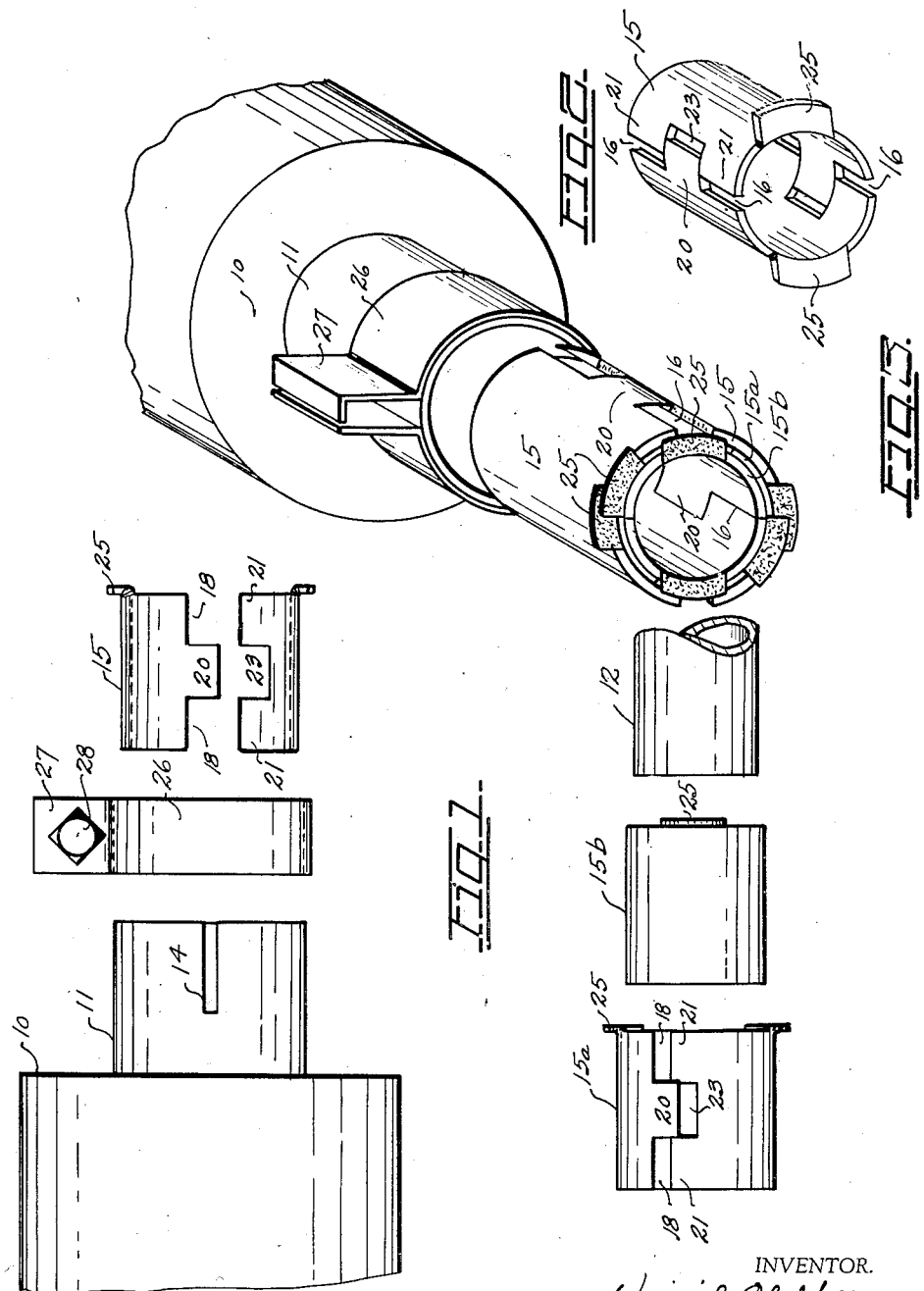
INVENTOR.
Virgil Oldberg
BY
Daniel G. Cullen.
ATTORNEY.

Dec. 12, 1933.   V. OLDBERG   1,938,974
BUSHING
Filed April 10, 1933   2 Sheets-Sheet 2
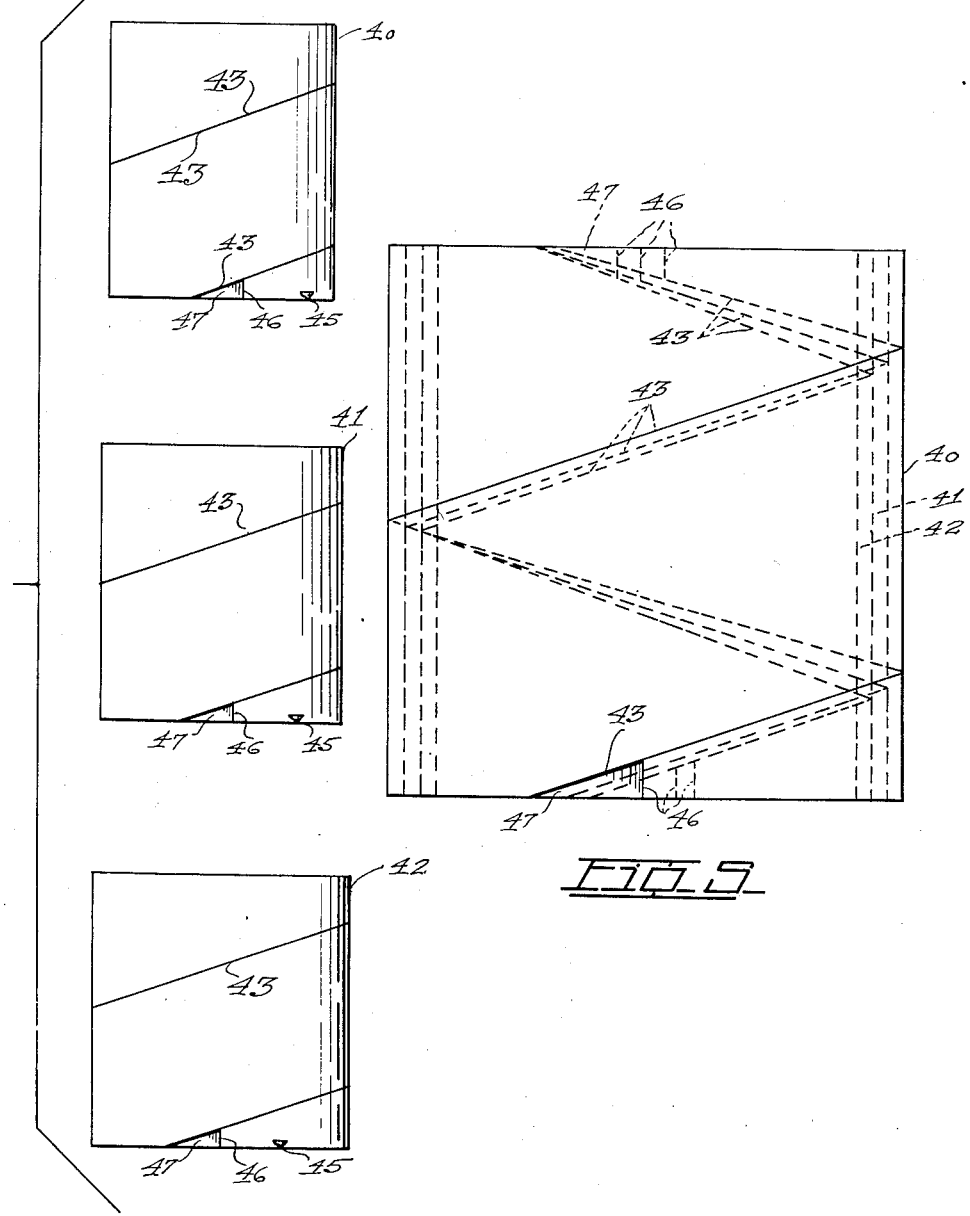

Patented Dec. 12, 1933

1,938,974

UNITED STATES PATENT OFFICE 1,938,974

BUSHING

Virgil Oldberg, Detroit, Mich., assignor to Oldberg Manufacturing Company, Detroit, Mich., a corporation of Michigan Application April 10, 1933. Serial No. 665,366

2 Claims. (Cl. 285—183)

This invention relates to couplings.

The principal object of this invention is to provide couplings employing novel bushings.

Still further objects of the invention will be observed upon reference to the following detailed description of the preferred embodiments, shown in the appended drawings. In these drawings:

Figure 1 shows a plurality of bushings arranged to act as reducers between a muffler connection and a pipe, the parts being shown in elevation and about to be telescoped;

Figure 2 shows a nest of bushings about to be telescoped into a muffler connection in turn surrounded by a clamping collar;

Figure 3 shows a single bushing;

Figure 4 shows a plurality of bushings, each of which is a spirally rolled metal ribbon;

Figure 5 shows them nested, and to larger scale.

Referring to the drawings, it will be seen that there is disclosed a muffler 10 whose connection 11 is to receive there within a pipe 12. The connection may be on the inlet or the outlet end of the muffler, and the pipe 12 may be the exhaust pipe or the tail pipe. Further, while the connection 11 is indicated as being the connection end of a muffler, it might well be any other connection part. For example, the connection 11 might be one pipe, to which is to be connected another pipe. Or, the connection 11 may be in the nature of a sleeve, into which is to be connected a rod. Still further, the connection 11 may be in the nature of a cupped end of a rod, into which is to be connected another rod.

The connection 11 is split as indicated at 14, so as to be contractible.

Disposed between the connection 11 and the pipe 12 is a nest of sheet metal reducing bushings including, in the form shown, three relatively telescoped bushings 15, 15a, and 15b. These actually are identical in dimension and construction but are separately referenced for purposes of convenience.

Each of the bushings is generally cylindrical in form, and includes two or more sections, separated by elemental splits 16. One end of the flat blank from which a bushing section is made is formed to provide two notches 18 separated by a tongue 20. The other end of the blank from which the same section of the bushing is made, is formed to provide two tongues 21, separated by a notch 23.

The tongues and the notches are longitudinally dimensioned so that each notch will receive a tongue, with a relatively close fit.

It is also observed that the notches and tongues are of the same length in a circumferential direction, so that when a bushing is contracted to form a complete cylinder of the smallest diameter (15b) the elemental split lines thereof will be substantially completely closed, (Figure 3).

Further, each section of the bushing is formed with a lug 25, for purposes to be described.

The bushings are utilized as follows: Before the end of the pipe 12 is inserted into the connection 11, a split clamping collar 26 of coventional construction and having wings 27 adapted to be connected by a contracting bolt 28, is thrust over the connection 11.

Then one or more bushings, as the mechanic who is doing the assembly thinks will be necessary, is thrust into the connection 11, the sections of each bushing being arranged substantially as shown in Figures 2 and 3 so as to form a nest of complete bushings. The lugs 25 engage one another, or end edges of the cylindrical parts of the bushings, so as to limit axial movement of the bushings. The gaps between the edges of the splits in the outer bushings of the nests will be greater than the gaps between the edges of the splits in the inner bushings of the nest, since the bushings are identically dimensioned, and it might possibly be, as indicated in Fig. 3, that the inner bushing of the nest will have no gap whatever at the split, the gap being completely closed as above described.

The mechanic then inserts the pipe end 12 into the nest of bushings and the assembly is then in a partially completed state, the parts being somewhat loose with respect to one another.

The clamping bolt 28 is then tightened and the parts are contracted to fit as closely as necessary to effect a tight connection.

It will be observed that the lugs 25 facilitate de-nesting of nested bushings, and also facilitate removal of bushings from the connection 11 or the end of pipe 12.

It will also be observed that the bushing sections when contracted are flexed much less than is the case where the bushings are each made of one piece.

Figure 4 shows a plurality of bushings 40, 41, 42, each of which is formed of a spirally rolled metal ribbon, with the edges 43 of the ribbons as close to one another as possible. When these are nested, as in Figure 5, the friction due to longitudinal interfitting and sliding of the bushings will close the cracks between edges 43 as completely as possible.

The parts are so proportioned, as to the ratio of the width of the ribbon to the diameter, that the pitch of the helical edges is very small. This permits the clamp 26 to cause the parts to "wind up" and facilitate the closing of the crack between the edges 43.

If desired, the bushings may be provided with struck out teats 45 which facilitate longitudinal separation of the bushings from the nest of them, these serving as substitutes for the lugs 25 of Figure 1. Further, the sharp angle ends of the ribbon stock are cut off, as at 46, and these provide notches 47 which receive teats of neighboring bushings when they are nested.

Now having described a preferred embodiment of the invention, reference will be had to the following claims for a determination of the scope of the invention:

1. Means forming a sealing connection between nested ends of pipes of dissimilar diameter and taking up all of the circumferential space between the nested ends comprising a nest of adapter or take up bushings disposed in and taking up all of the circumferential space between the nested ends, each of said bushings being in the form of a spirally rolled metal ribbon which, when assembled in the space between the nested ends of the pipes, has its helical split line closed for sealing purposes.

2. Means forming a sealing connection between nested ends of pipes of dissimilar diameter and taking up all of the circumferential space between the nested ends comprising an adapter or take up bushing disposed in and taking up all of the circumferential space between the nested ends, said bushing being in the form of a spirally rolled metal ribbon which, when in the space between the nested ends of the pipes, has its helical split line closed for sealing purposes.

VIRGIL OLDBERG.